(12) United States Patent
Barndt et al.

(10) Patent No.: US 10,282,111 B2
(45) Date of Patent: May 7, 2019

(54) ADAPTIVE WEAR LEVELLING

(71) Applicant: WESTERN DIGITAL TECHNOLOGIES, INC., Irvine, CA (US)

(72) Inventors: Richard David Barndt, San Diego, CA (US); Aldo G. Cometti, San Diego, CA (US); Scott Thomas Kayser, San Diego, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 237 days.

(21) Appl. No.: 15/331,552

(22) Filed: Oct. 21, 2016

(65) Prior Publication Data

US 2018/0032268 A1 Feb. 1, 2018

Related U.S. Application Data

(60) Provisional application No. 62/368,967, filed on Jul. 29, 2016.

(51) Int. Cl.
*G06F 3/00* (2006.01)
*G06F 3/06* (2006.01)
*G06F 12/02* (2006.01)

(52) U.S. Cl.
CPC ............ *G06F 3/0616* (2013.01); *G06F 3/064* (2013.01); *G06F 3/0647* (2013.01);
(Continued)

(58) Field of Classification Search
None
See application file for complete search history.

(56) References Cited

U.S. PATENT DOCUMENTS

| | | |
|---|---|---|
| 7,096,313 B1 | 8/2006 | Chang et al. |
| 8,239,614 B2 | 8/2012 | Asnaashari et al. |

(Continued)

OTHER PUBLICATIONS

Yang et al., "New ERA: New Efficient Reliability-Aware Wear Leveling for Endurance Enhancement of Flash Storage Devices," Design Automation Conference (DAC), 2013 50th ACM/EDAC/IEEE, 6 pages.

*Primary Examiner* — David Yi
*Assistant Examiner* — Craig S Goldschmidt
(74) *Attorney, Agent, or Firm* — Morgan, Lewis & Bockius LLP (57) ABSTRACT

A device that provides for adaptive wear levelling includes at least one processor. The at least one processor utilizes sets of blocks of flash memory circuits for data storage operations, each set of blocks including a block from each flash memory circuit and at least some of the blocks being marked active for the data storage operations. The at least one processor monitors a quality metric of each block while the blocks marked active are utilized for data storage operations. The at least one processor determines when the quality metric of a block falls below a minimum level and marks the block as temporarily inactive, where the block is not utilized for the data storage operations while marked temporarily inactive. The at least one processor, when a criterion is satisfied, marks the block as active so that the block can again be utilized for the data storage operations.

21 Claims, 4 Drawing Sheets

(52) U.S. Cl.
CPC .......... *G06F 3/0653* (2013.01); *G06F 3/0679* (2013.01); *G06F 12/0246* (2013.01); *G06F 2212/1036* (2013.01); *G06F 2212/7211* (2013.01)

(56) References Cited

U.S. PATENT DOCUMENTS

| | | |
|---|---|---|
| 8,656,118 B2 | 2/2014 | Franceschini et al. |
| 8,738,846 B2 | 5/2014 | Son et al. |
| 8,832,506 B2 | 9/2014 | Griffin et al. |
| 8,862,810 B2 | 10/2014 | Lee et al. |
| 8,898,373 B1 | 11/2014 | Kang et al. |
| 2009/0276602 A1* | 11/2009 | Chedru ................ G06F 12/023 711/171 |
| 2010/0228928 A1* | 9/2010 | Asnaashari ......... G06F 12/0246 711/154 |
| 2011/0029715 A1* | 2/2011 | Hu et al. ............. G06F 12/0246 711/103 |
| 2012/0311237 A1* | 12/2012 | Park ................... G06F 12/0246 711/103 |
| 2014/0189421 A1* | 7/2014 | Werner ............... G06F 11/2056 714/6.21 |
| 2016/0054937 A1* | 2/2016 | Tuers ...................... G11C 7/04 711/103 |

* cited by examiner

ADAPTIVE WEAR LEVELLING

CROSS-REFERENCE TO RELATED APPLICATIONS

The present application claims the benefit of U.S. Provisional Patent Application Ser. No. 62/368,967, entitled "Adaptive Wear Levelling," filed on Jul. 29, 2016, which is hereby incorporated by reference in its entirety for all purposes.

TECHNICAL FIELD

The present description relates generally to wear levelling including adaptive wear levelling for flash memory devices.

BACKGROUND

In a flash memory system, to achieve high endurance the system typically employs a wear levelling algorithm that keeps all of the physical blocks within a tight range of cumulative program/erase (P/E) cycles. The assumption being that the physical blocks all have the same endurance (when disregarding the weak blocks that are compensated for by over-provisioning) and therefore will all wear out at substantially the same time. However, in practice the physical blocks do not all have the same endurance. Thus, the flash memory system may reach its specified end of life while many of the physical blocks are still be usable.

SUMMARY

The disclosed subject matter relates to a device that includes at least one processor. The at least one processor may be configured to utilize sets of blocks of flash memory circuits for data storage operations, each of the sets of blocks including at least one block from each of the flash memory circuits and at least some of the blocks of at least some of the sets of blocks being marked active, wherein the at least some of the blocks of the at least some of the sets of blocks that are marked as active are utilized for the data storage operations. The at least one processor may be further configured to monitor quality metrics of each of block of each of the sets of blocks while the at least some of the blocks of the at least some of the sets of blocks that are marked as active are utilized for the data storage operations. The at least one processor may be further configured to determine when the quality metric of one of the blocks of one of the sets of blocks falls below a minimum quality level. The at least one processor may be further configured to mark the one of the blocks of the one of the sets of blocks as temporarily inactive, wherein the one of the blocks of the one of the sets of blocks is not utilized for the data storage operations while marked temporarily inactive. The at least one processor may be further configured to, when at least one criterion is satisfied, mark the one of the blocks of the one of the sets of blocks as active, wherein the one of the blocks of the one of the sets of blocks is again utilized for the data storage operations while marked as active.

In another aspect, a method may include utilizing sets of blocks of a plurality of flash memory circuits for data storage operations, each of the sets of blocks including at least one block from each of the plurality of flash memory circuits and at least some of the blocks of at least some of the sets of blocks being marked active, wherein the at least some of the blocks of the at least some of the sets of blocks that are marked as active are utilized for the data storage operations. The method may further include monitoring a remaining cycle count of each of the blocks of each of the sets of blocks while the at least some of the blocks of the at least some of the sets of blocks that are marked as active are utilized for the data storage operations, wherein the remaining cycle count of each of the blocks of each of the sets of blocks is based at least in part on an expected cycle count associated with each of the plurality of flash memory circuits containing each of the blocks of each of the sets of blocks. The method may further include, when the remaining cycle count of one of the blocks of one of the sets of blocks satisfies at least one first criterion, marking the one of the blocks of the one of the sets of blocks as temporarily inactive, wherein the one of the blocks of the one of the sets of blocks is not utilized for the data storage operations while marked temporarily inactive. The method may further include, when at least one second criterion is satisfied, mark the one of the blocks of the one of the sets of blocks as active, wherein the one of the blocks of the one of the sets of blocks is again utilized for the data storage operations while marked as active.

In another aspect, a computer program product comprises code stored in a non-transitory computer-readable storage medium. The code may include code to rapidly cycle a respective physical block of each of a plurality of flash memory circuits until a respective quality metric of the respective physical block of each of the plurality of flash memory circuits falls below a minimum quality level. The code may further include code to determine an expected cycle count for each of the plurality of flash memory circuits based at least in part on a number of rapid cycles utilized to cause the respective quality metric of the respective physical block of each of the plurality of flash memory circuits to fall below the minimum quality level. The code may further include code to store, in at least one random access memory circuit, the expected cycle count for each of the plurality of flash memory circuits in association individually with physical blocks of each of the plurality of flash memory circuits.

In another aspect, a system may include a plurality of flash memory circuits each comprising blocks, a random access memory (RAM) configured to store a data structure that comprises a status of each of the blocks of each of the plurality of flash memory circuits, the status of each of the blocks of each of the plurality of flash memory circuits indicating at least if each the blocks of each of the plurality of flash memory circuits is marked active or is marked temporarily inactive, an interface communicatively coupled to a host device, and a controller. The controller may be configured to utilize sets of the blocks of the plurality of flash memory circuits for data storage operations indicated by the host device, each of the sets of the blocks including at least one block from each of the plurality of flash memory circuits and at least some of the blocks of at least some of the sets of the blocks being marked active in the data structure, wherein the at least some of the blocks of the at least some of the sets of the blocks that are marked as active in the data structure are utilized for the data storage operations. The controller may be further configured to monitor a quality metric of each of the blocks of each of the sets of the blocks while the at least some of the blocks of the at least some of the sets of the blocks that are marked as active in the data structure are utilized for the data storage operations. The controller may be further configured to determine when the quality metric of one of the blocks of one of the sets of the blocks falls below a minimum quality level. The controller may be further configured to mark the one of the blocks of the one of the sets of the blocks as temporarily inactive in the data structure, wherein the one of the blocks of the one of the sets of the blocks is not utilized for the data storage operations while marked temporarily inactive in the data structure. The controller may be further configured to, when at least one criterion is satisfied, mark the one of the blocks of the one of the sets of the blocks as active in the data structure, wherein the one of the blocks of the one of the sets of the blocks is again utilized for the data storage operations while marked as active in the data structure.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for adaptive wear levelling, prior to utilizing flash memory circuits of a flash storage system for data storage, a single physical block on each flash memory circuit (e.g. a single flash memory die/chip), is rapidly cycled (P/E cycled) until a quality metric associated with the physical block (e.g. error count, error rate, program time) falls below a minimum quality level. The number of cycles utilized to cause the quality metric of the respective physical block of each respective flash memory circuit to fall below the minimum quality level is stored as the expected cycle count for all of the physical blocks of the respective flash memory circuit. Accordingly, an assumption is made that the endurance deviation between physical blocks of a single flash memory circuit is minimal.

While the sets of blocks (or superblocks) arranged from the physical blocks of the flash memory circuits are being utilized for data storage purposes, the subject system monitors the expected remaining number of cycles for each of the physical blocks. The expected remaining number of cycles for a given block may be determined by subtracting the current cycle count for the block from the expected cycle count for the block. The subject system determines when the expected remaining number of cycles in a block of a given set of blocks is falling behind the expected remaining number of cycles of other blocks of the given set of blocks. In this instance, the subject system marks the block as temporarily inactive which prevents the block from being utilized in the data storage operations. When the expected remaining cycle counts of the other blocks in the set of blocks catch up to the expected remaining cycle count of the block, the subject system marks the block as active which makes the block again available to be utilized for data storage operations. The subject system may also mark the block as active, irrespective of the expected remaining cycle counts, e.g. to satisfy other storage conditions that are discussed further below.

Alternatively, or in addition, the subject system may also provide for adaptive wear levelling by using code rate shifting. In this instance, the subject system may not perform the initial rapid cycling of a respective block of each of the flash memory circuits, but may instead monitor a quality metric of each of the blocks while the sets of blocks are being utilized for the data storage operations. When the quality metric of a block falls below a minimum quality level, the block is marked as temporarily inactive. When a certain number of blocks of a given set of blocks have been marked as temporarily inactive, the code rate for the given set of blocks is decreased to compensate for the reduction in quality of the blocks that were temporarily inactive. After the code rate is decreased for the given set of blocks, all of the blocks of the given set of blocks are marked as active. The subject system may also decrease the code rate of a given set of blocks and mark the blocks of the given set of blocks as active, irrespective of the number of blocks of the given set have been marked as inactive, e.g. to satisfy other storage conditions that are discussed further below.

In one or more implementations, the subject system may implement both the initial rapid cycling of a respective block from each of the flash memory circuits and the code rate shifting to provide for adaptive wear levelling. For example, the subject system may estimate for each block of a set of blocks an expected number of cycles before the quality metric of each block will fall below the minimum quality level at the current code rate, e.g. based on the expected cycle count for each block. The subject system may then manage the utilized cycles of the blocks of the set of blocks, e.g. by temporarily inactivating one or more of the blocks as necessary, such that most of the blocks of the set of blocks will reach the minimum quality level at substantially the same time for the given code rate. The code rate for the set of blocks is then decreased and all of the blocks of the set of blocks are marked as active and are again available for data storage operations.

Figure 1:
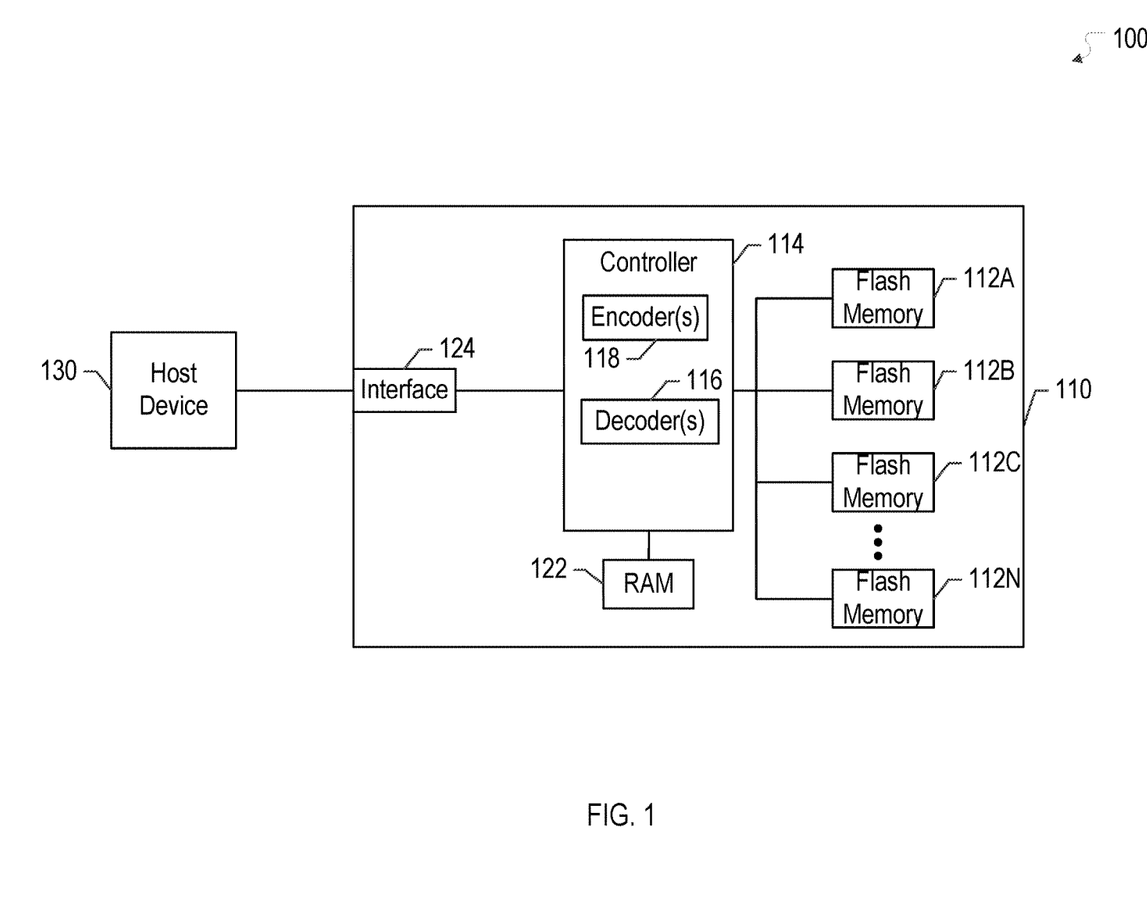
FIG. 1 illustrates an example flash memory system that may implement a system for providing adaptive wear levelling in accordance with one or more implementations.

FIG. 1 illustrates an example flash memory system 100 that may implement a system for providing adaptive wear levelling in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The system 100 includes a flash memory device 110 and a host device 130. The flash memory device 110 includes one or more flash memory circuits 112A-N, a controller 114, a random access memory (RAM) 122 and an interface 124. The controller 114 includes one or more decoders 116, such as error-correcting code (ECC) decoders, and one or more encoders 118, such as ECC encoders. The one or more decoders 116 and/or the one or more encoders 118 may be one or more dedicated circuits of the controller 114 and/or may be implemented via firmware running on the controller 114.

The interface 124 of the flash memory device 110 couples the flash memory device 110 to the host device 130. The interface 124 may be a wired interface, such as a Personal Computer Memory Card International Association (PCM-CIA) interface, a Serial AT Attachment (SATA) interface, a universal serial bus (USB) interface, or generally any wired interface. Alternatively, or in addition, the interface 124 may be a wireless interface, such as wireless SATA, Bluetooth, or generally any wireless interface.

The controller 114 is operable to read data from, and write data to, the flash memory circuits 112A-N. For example, the controller 114 receives data, such as a stream of data, from the host device 130 via the interface 124, where the data is then written to one or more of the flash memory circuits 112A-N. The flash memory circuits 112A-N may each include one or more physical blocks, such as NAND blocks and/or NOR blocks. The physical blocks may each include one or more physical pages. The controller 114 may utilize the RAM 122 to assist with reading/writing data to/from the flash memory circuits 112A-N. For example, the RAM 122 may be used as a buffer for rate control, or may otherwise be used to store information (e.g. variables, physical block status, logical to physical address mapping tables, endurance/retention data, settings, etc.) utilized by the controller 114 to read/write data to/from the flash memory circuits 112A-N. Since the RAM 122 may be volatile memory, the controller 114 may permanently store information in one or more of the flash memory circuits 112A-N. When the flash memory device 110 is powered on, the controller 114 may retrieve the information from the one or more flash memory circuits 112A-N and store the information in the RAM 122.

The controller 114 may implement one or more algorithms or techniques in conjunction with reading and/or writing data to the flash memory circuits 112A-N, such as security techniques (e.g. encryption), error correction coding techniques (e.g. LDPC), compression techniques, redundancy techniques (e.g. redundant array of independent disks (RAID) techniques), etc. For example, the controller 114 may use redundancy techniques by generating logical sets of physical blocks across multiple flash memory circuits 112A-N, which may be referred to as stripes, superblocks, or sets of blocks. The controller 114 may write data to a given set of blocks as a single unit. In this manner, the data is spread out across multiple of the flash memory circuits 112A-B and may therefore be recoverable if one or more of the flash memory circuits fails. Example logical groupings of physical blocks of the flash memory circuits 112A-N are discussed further below with respect to FIG. 2.

Since the integrity of the flash memory circuits 112A-N degrades with use over time, thereby increasing the raw bit error rate (RBER) associated with data read from the flash memory circuits 112A-N, the code rate, such as an ECC code rate or any other code rate, used by the encoder 118 to encode each of the data items may differ depending on the integrity of the set of blocks to which the encoded data items are being written. For example, the flash memory circuits 112A-N may be designed to reliably perform a maximum number of data transfer operations, e.g. program-erase (P/E) cycles and/or read/write operations, and the integrity of the flash memory circuits 112A-N may degrade as the cycle count increases and/or the flash memory circuits 112A-N approach or surpass the maximum number of read and/or write operations. In order to account for this degradation over time/use, the controller 114 utilizes variable code rate error correction coding where the code rate used by the encoder 118 decreases as the integrity of the flash memory circuits 112A-N degrades, thereby providing additional protection to the data.

In order to determine the appropriate code rate to use for writing data to a given set of blocks, the controller 114 may monitor the integrity of the blocks of the set of blocks of the flash memory circuits 112A-N. The monitoring may be based on, for example, the RBER associated with data read from the flash memory circuits 112A-N. When the controller 114 determines that the integrity of the blocks of a set of blocks the flash memory circuits 112A-N has degraded below a threshold amount, the controller 114 may change (e.g. decrease) the code rate used by the encoder 118 to perform the error correction coding for the set of blocks. The changing of the code rate may be referred to as code rate shifting.

However, since each set of blocks includes blocks from different flash memory circuits 112A-N, each of the blocks of each set of blocks may degrade at different rates. Thus, as the quality metric of a block of a given set of blocks falls below the minimum acceptable quality level, the controller 114 temporarily deactivates the block until a certain number of the blocks of the set of blocks have been deactivated. At this time, the controller 114 decreases the code rate for the entire set of blocks and reactivates all of the blocks of the set of blocks. An example process of adaptive wear levelling using code rate shifting is discussed further below with respect to FIG. 3. For explanatory purposes, code rates are generally referenced herein; however, code rates may refer to ECC code rates, or generally any code rates.

The controller 114 may also, e.g. at startup, rapidly perform numerous program/erase (P/E) cycles on a single block from each of the flash memory circuits 112A-N. The controller may monitor a quality metric of the block (e.g. RBER, error count, program time) to empirically determine how many cycles are performed before the quality metric falls below a minimum acceptable quality level. The controller 114 may store, e.g. in the RAM 122, the number of cycles performed for the block as the expected cycle count for all of the blocks of the flash memory circuit containing the block. The controller 114 then can temporarily deactivate blocks as necessary to ensure that all of the blocks of a given set of blocks reach the expected end of life at substantially the same time. Thus, in one or more implementations, the expected cycle count may refer to, for example, an end of life cycle count. An example process of adaptive wear levelling using empirically determined expected cycle counts is discussed further below with respect to FIG. 4.

In one or more implementations, one or more of the controller 114, the decoder 116, the encoder 118, and/or the interface 124, and/or one or more portions thereof, may be implemented in software (e.g., firmware, subroutines, and/or code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, and/or any other suitable devices) and/or a combination of both.

Figure 2:
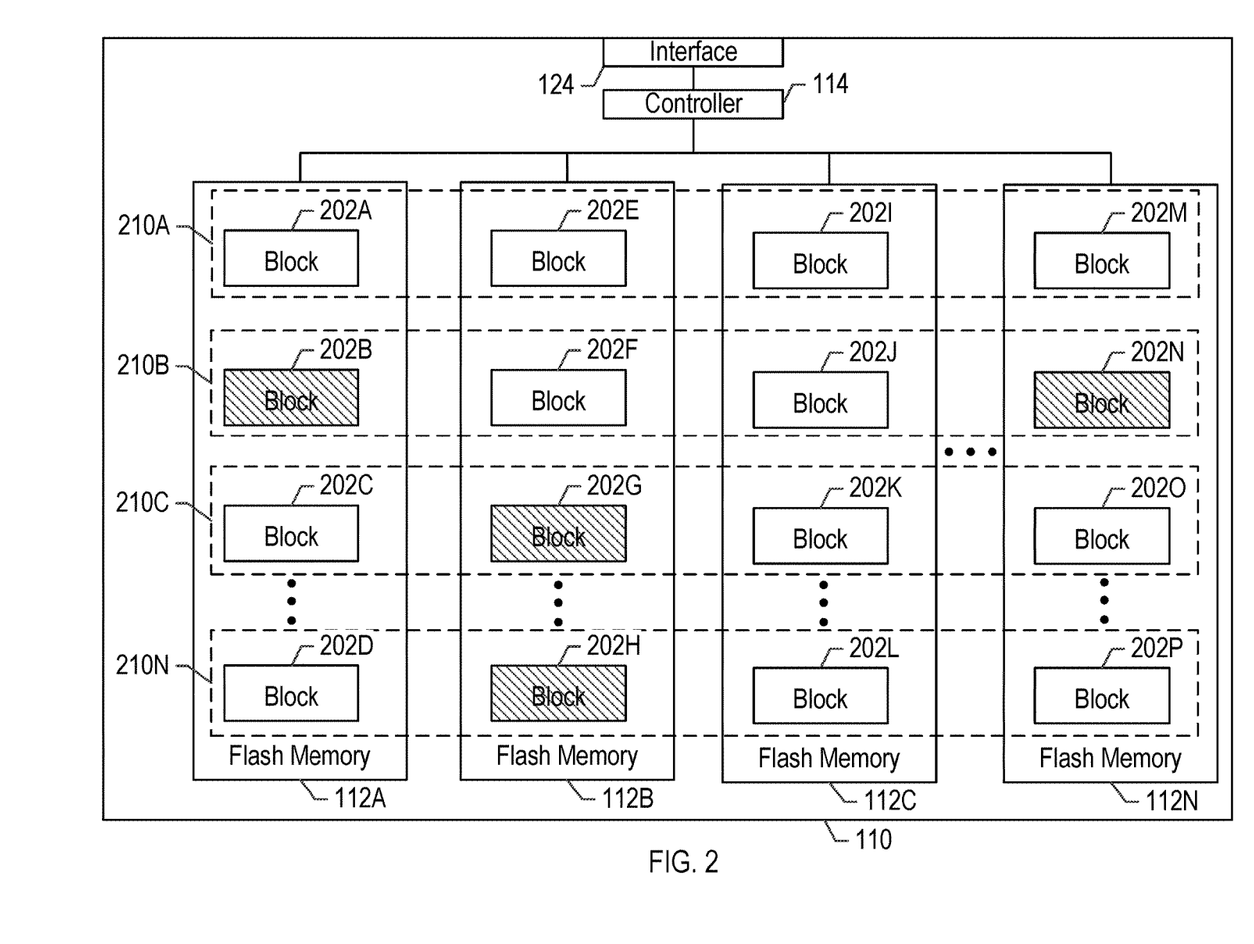
FIG. 2 illustrates example logical groupings of physical blocks of flash memory circuits in an example flash memory device in accordance with one or more implementations.

FIG. 2 illustrates example logical groupings of physical blocks of flash memory circuits 112A-N in an example flash memory device 110 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example flash memory device 110 includes the interface 124, the controller 114, and one or more flash memory circuits 112A-N. The flash memory circuits 112A-N each include one or more physical blocks 202A-P of flash memory, which may also be referred to as blocks 202A-P. The flash memory circuit 112A includes the blocks 202A-D, the flash memory circuit 112B includes the blocks 202E-H, the flash memory circuit 112C includes the blocks 202I-L, and the flash memory circuit 112N includes the blocks 202M-P.

As shown in FIG. 2, the controller 114 logically groups the blocks 202A-P of the flash memory circuits 112A-N into logical sets of blocks 210A-N, where each of the sets of blocks 210A-N includes at least one block from each of the flash memory circuits 112A-N. The controller 114 may use each of the sets of blocks 210A-N as individual RAID stripes with parity/ECC data to allow for data recovery if one or more blocks 202A-P within the individual sets of blocks 210A-N goes bad. In this manner, data written to the flash memory circuits 112A-N can still be recovered when one or more of the flash memory circuits 112A-N, and/or one more of the blocks 202A-P therein, fails. Each of the sets of blocks 210A-N is programmed and erased by the controller 114 as a logical unit. In one or more implementations, the sets of blocks 210A-N may be referred to as stripes, superblocks, logical units, etc. Each of the set of blocks 210A-N may be associated with a different code rate. The set of blocks 210A-N may all be initially associated with the same code rate; however, the code rates associated with the set of blocks 210A-N may change, and therefore differ, over time.

As shown in FIG. 2, the set of blocks 210A includes the block 202A of the flash memory circuit 112A, the block 202E of the flash memory circuit 112B, the block 202I of the flash memory circuit 112C, and the block 202M of the flash memory circuit 112N. The set of blocks 210B includes the block 202B of the flash memory circuit 112A, the block 202F of the flash memory circuit 112B, the block 202J of the flash memory circuit 112C, and the block 202N of the flash memory circuit 112N. The set of blocks 210C includes the block 202C of the flash memory circuit 112A, the block 202G of the flash memory circuit 112B, the block 202K of the flash memory circuit 112C, and the block 202O of the flash memory circuit 112N. The set of blocks 210N includes the block 202D of the flash memory circuit 112A, the block 202H of the flash memory circuit 112B, the block 202L of the flash memory circuit 112C, and the block 202P of the flash memory circuit 112N.

The blocks 202A-P may each be associated with a status that may be, for example, stored by the controller 114 in the RAM 122. The status of the blocks may include, for example, active blocks, retired blocks, manufacturer bad blocks (MBBs), grown bad blocks (GBBs), or temporarily inactive blocks, which may also be referred to as on vacation blocks (OVBs). Blocks that are active may be available for data storage operations (e.g. reading/writing); however, blocks that are retired, MBBs, GBBs, or temporarily inactive may not be available for data storage operations. In FIG. 2, the blocks 202B,G,H,N that are shaded are blocks that are temporarily inactive and therefore are not available for data storage operations.

In one or more implementations, one or more of the controller 114 and/or the interface 124, and/or one or more portions thereof, may be implemented in software (e.g., firmware, subroutines, and/or code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, and/or any other suitable devices) and/or a combination of both.

Figure 3:
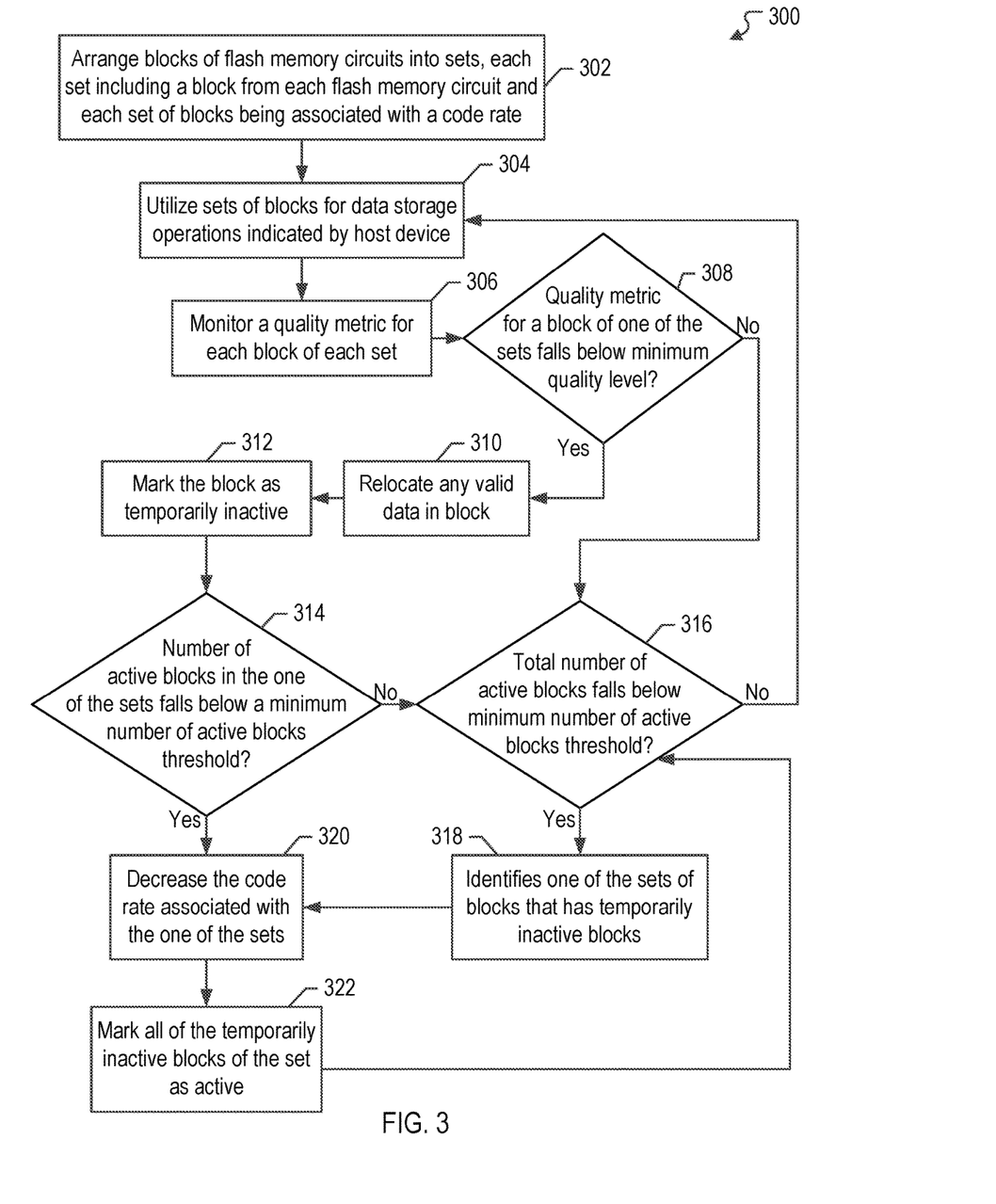
FIG. 3 illustrates a flow diagram of an example process of adaptive wear levelling using code rate shifting in accordance with one or more implementations.

FIG. 3 illustrates a flow diagram of an example process 300 of adaptive wear levelling using code rate shifting in accordance with one or more implementations. For explanatory purposes, the example process 300 is described herein with reference to the controller 114 of FIGS. 1 and 2; however, the example process 300 is not limited to the controller 114 of FIGS. 1 and 2, and one or more blocks of the example process 300 may be performed by one or more other components of the controller 114. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed.

Prior to performing any data storage operations on the flash memory circuits 112A-N, the controller 114 arranges the blocks 202A-P of the flash memory circuits 112A-N into sets of blocks 210A-N where each set of blocks 210A-N includes one of the blocks 202A-P from each of the flash memory circuits 112A-N and each of the sets of blocks 210A-N is associated with a code rate (302). For example, the controller 114 may arrange the set of blocks 210A-N at start-up and/or the controller 114 may be preconfigured with the arrangement of the set of blocks 210A-N. In one or more implementations, the controller 114 may use the blocks at same physical block addresses in each of the flash memory circuits 112A-N to form each of the sets of blocks 210A-N. The code rate may initially be the same for each of the sets of blocks 210A-N but may change over time with use. The blocks 202A-P of the flash memory circuits 112A-N may all be initially marked as active, with the exception of any manufacturer bad blocks.

The controller 114 utilizes the sets of blocks 210A-N to perform data storage operations indicated by the host device 130 (304). The data storage operations may involve one or more read and/or write operations on one or more of the sets of blocks 210A-N and the data storage operations may be limited to the blocks 202A-P of the sets of blocks 210A-N that are marked as active. The data storage operations may also result in one or more background operations, such as garbage collection, that may involve one or more program/erase cycles with regard to one or more of the sets of blocks 210A-N.

The controller 114 monitors a quality metric of each of the blocks 202A-P of each of the sets of blocks 210A-N (306). The quality metric may include, for example, RBER, error count, program time, etc. The controller 114 determines whether the quality metric for a block, such as the block 202B, of one of the sets of blocks, such as the set of blocks 210B, falls below the minimum quality level (308). The minimum quality level may be, for example, the maximum RBER that can be sustained while meeting predetermined performance constraints, such as read and/or write times.

If the controller 114 determines that the quality metric of a block of one of the sets of blocks, such as the block 202B of the set of blocks 210B, falls below the minimum quality level (308), the controller 114 relocates any valid data in the block 202B, e.g. to another active block (310). The controller 114 then marks the block 202B as temporarily inactive (312). For example, the controller 114 may change a status of the block 202B that is stored in the RAM 122 to indicate that the block 202B is temporarily inactive and therefore not available for programming/erasing.

The controller 114 then determines whether the number of remaining active blocks 202F,J of the set of blocks 210B is below a minimum number of active blocks threshold. The threshold may be based on the code rate associated with the set of blocks 210B (314). For example, the controller 114 may set a minimum available data capacity to be maintained by each of the sets of blocks 210A-N. The available data capacity for a given set of blocks may be determined based on the number of blocks in the set of blocks that are currently active and the data capacity of each block at the given code rate associated with the set of blocks.

If the controller 114 determines that the number of remaining active blocks 202F,J of the set of blocks 210B is below the minimum number of active blocks threshold for the code rate (314), the controller 114 decreases the code rate associated with the set of blocks 210B (320) to compensate for the reduction in quality of the temporarily inactive blocks 202B,N of the set of blocks 210B. After decreasing the code rate (320), the controller 114 marks all of the temporarily inactive blocks 202B,N of the set of blocks 210B to be active such that the blocks 202B,N are again available for data storage operations (322).

If the controller 114 determines that the number of active blocks 202F,J in the set of blocks 210B does not fall below the minimum number of active blocks threshold (314), the controller 114 determines whether the total number of active blocks 202A-P across all of the flash memory circuits 112A-N has fallen below the minimum number of active blocks threshold (316). For example, when the number of active blocks falls below a minimum number of active blocks threshold, the over-provisioning of the flash memory device 110 may reach a minimum level and therefore more blocks may need to be made active.

If the controller 114 determines that the total number of active blocks 202A-P across the flash memory circuits 112A-N has fallen below the minimum number of active blocks threshold, the controller 114 searches for one of the sets of blocks 210A-N, such as the set of blocks 210B, that has one or more temporarily inactive blocks (318). For example, the controller 114 may search for one of the sets of blocks 210A-N that has a highest number of temporarily inactive blocks relative to the other sets of blocks 210A-N. Upon identifying a set of blocks 210B, the controller 114 decreases the code rate of the identified set of blocks 210B (320), marks all of the temporarily inactive blocks 202B,N of the set of blocks 210B as active (322), and repeats the process (318-322) until the total number of active blocks across all of the flash memory circuits 112A-N exceeds the minimum number of active blocks threshold (316).

Figure 4:
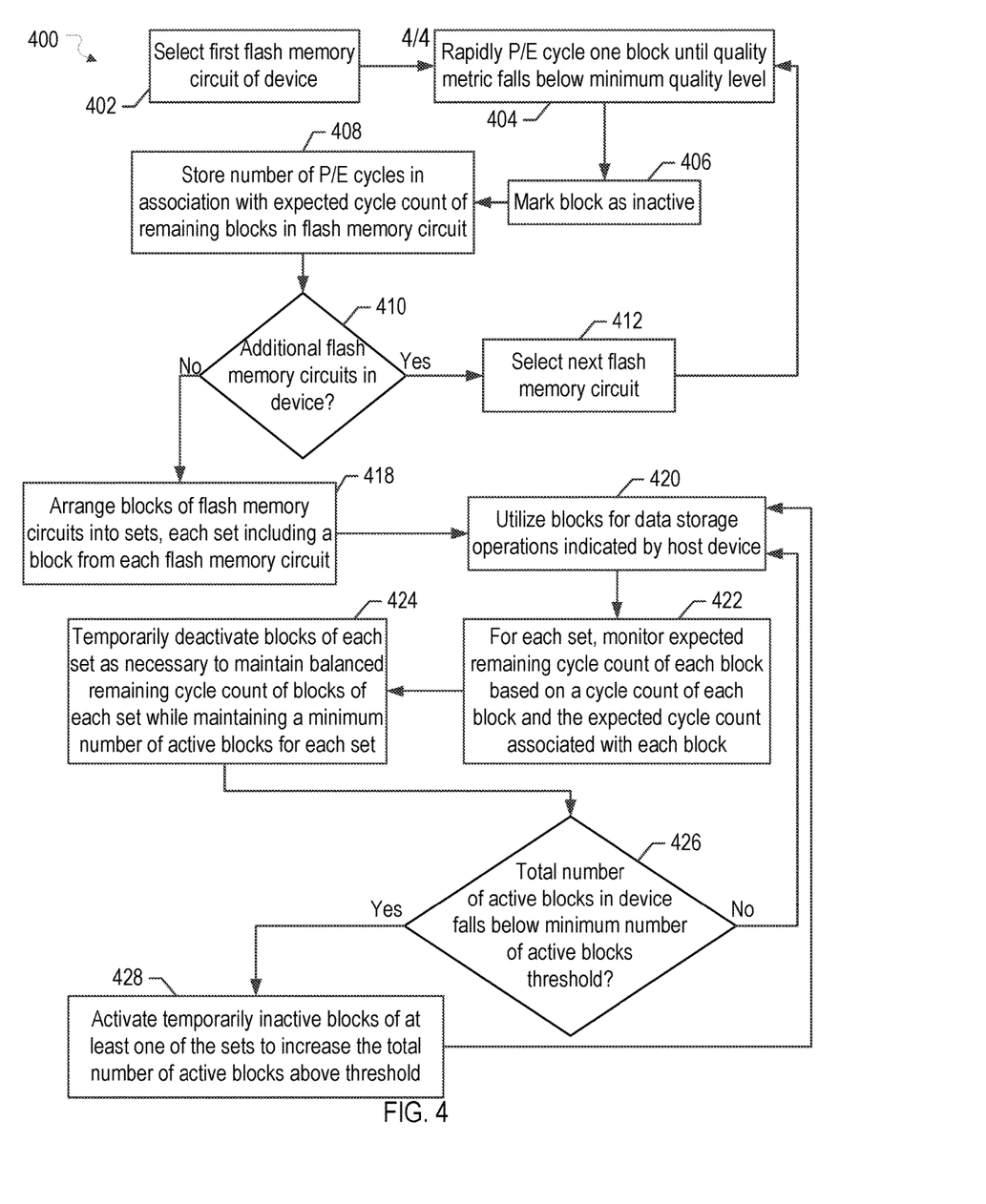
FIG. 4 illustrates a flow diagram of an example process of adaptive wear levelling using empirically determined expected cycle counts in accordance with one or more implementations.

FIG. 4 illustrates a flow diagram of an example process 400 of adaptive wear levelling using empirically determined expected cycle counts in accordance with one or more implementations. For explanatory purposes, the example process 400 is described herein with reference to the controller 114 of FIGS. 1 and 2; however, the example process 400 is not limited to the controller 114 of FIGS. 1 and 2, and one or more blocks of the example process 400 may be performed by one or more other components of the controller 114. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

Prior to performing any data storage operations on the flash memory circuits 112A-N, the controller 114 selects the first flash memory circuit 112A of the flash memory device 110 (402). The controller 114 performs rapid program/erase (P/E) cycles on one block 202A from the first flash memory circuit 112A until a quality metric associated with the block 202A falls below a minimum quality level (404). The quality metric may be, for example, RBER, error count, program time, etc. The controller 114 then marks the block 202A as inactive, or retired, such that the block 202A will not be available for data storage operations (406). The controller 114 stores the number of P/E cycles that caused the quality metric of the block 202A to fall below the minimum quality level as the expected cycle count of the remaining blocks 202B-D of the flash memory circuit 112A (408).

The controller 114 determines whether there are any additional flash memory circuits 112B-N in the flash memory device 110 (410). If the controller 114 determines that there are additional flash memory circuits 112B-N in the flash memory device 110, the controller 114 selects the next flash memory circuit 112B (412) and repeats the process (404-408). If the controller 114 determines that there are no further flash memory circuits 112A-N in the flash memory device 110, the controller 114 arranges the blocks 202A-P of the flash memory circuits 112A-N into sets of blocks 210A-N, where each set of blocks 210A-N includes a block from each of the flash memory circuits 112A-N (418).

The controller 114 utilizes the sets of blocks 210A-N to perform data storage operations indicated by the host device 130 (420). The data storage operations may involve one or more read and/or write operations on one or more of the sets of blocks 210A-N and the data storage operations may be limited to the blocks 202A-P of the sets of blocks 210A-N that are marked as active. The data storage operations may also result in one or more background operations, such as garbage collection, that may involve one or more program/erase cycles with regard to one or more of the sets of blocks 210A-N.

The controller 114 monitors an expected remaining cycle count of each of the blocks 202A-P of each of the sets of blocks 210A-N (422). The expected remaining cycle count of each of the blocks 202A-P may be determined based on the expected cycle count stored for each of the blocks 202A-P minus the current cycle count (or utilized number of cycles) for each of the blocks 202A-P. The controller 114 temporarily deactivates one or more blocks 202A-P of each of the sets of blocks 210A-N as necessary to maintain balanced remaining cycle counts of the blocks 202A-P of each of the sets of blocks 210A-N while also maintaining a minimum number of active blocks for each of the sets of blocks 210A-N (424).

For example, if the expected remaining cycle count of the block 202A trails the expected remaining cycle count of another one of the blocks 202E,I,M in the set of blocks 210A by a threshold amount, the block 202A may be set to temporarily inactive. The block 202A may remain temporarily inactive until the expected remaining cycle counts of one or more of the other blocks 202E,I,M of the set of blocks 210A catch up to (or within a threshold amount) of the expected remaining cycle count of the block 202A. At that time, the block 202A may be marked as active and therefore again available for data storage operations. However, if the total number of active blocks 202E,I,M for the set of blocks 210A falls below a minimum number of active blocks for the set of blocks 210A, the block 202A may be marked as active regardless of whether the expected remaining cycles of the other blocks 202E,I,M catch up to the block 202A.

The controller 114 determines whether the total number of active blocks 202A-P in the flash memory device 110 has fallen below a minimum number of active blocks (426). If the controller 114 determines that the total number of active blocks 202A-P in the flash memory device 110 has fallen below the minimum number of active blocks (426), the controller 114 activates some of the temporarily inactive blocks of at least some of the sets of blocks 210A-N, e.g. irrespective of expected remaining cycles, to increase the total number of active blocks in the flash memory device 110 above the minimum number of active blocks threshold (428).

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   at least one processor configured to:
   utilize sets of blocks of flash memory circuits for data storage operations, each of the sets of blocks including at least one block from each of the flash memory circuits and at least some of the blocks of at least some of the sets of blocks being marked active, wherein the at least some of the blocks of the at least some of the sets of blocks that are marked as active are utilized for the data storage operations;
   monitor quality metrics of each block of each of the sets of blocks while the at least some of the blocks of the at least some of the sets of blocks that are marked as active are utilized for the data storage operations;
   determine when the quality metric of one of the blocks of one of the sets of blocks falls below a minimum quality level;
   mark the one of the blocks of the one of the sets of blocks as temporarily inactive, wherein the one of the blocks of the one of the sets of blocks is not utilized for the data storage operations while marked temporarily inactive;
   determine that at least one criterion is satisfied when a number of the blocks of the one of the sets of blocks that are marked as active falls below a minimum number of active blocks for a code rate associated with the one of the sets of blocks, wherein each of the sets of blocks is associated with the code rate; and
   when the at least one criterion is satisfied, mark the one of the blocks of the one of the sets of blocks as active, wherein the one of the blocks of the one of the sets of blocks is again utilized for the data storage operations while marked as active.

2. The device of claim 1, wherein the at least one processor is further configured to:
   responsive to determining that the criterion is satisfied, decrease the code rate associated with the one of the sets of blocks; and
   responsive to decreasing the code rate, mark any blocks of the one of the sets of blocks that are marked as temporarily inactive as active, wherein any blocks of the one of the sets of blocks that are marked as active are again utilized for the data storage operations.

3. The device of claim 2, wherein the minimum number of active blocks for the code rate is less than another minimum number of active blocks for the decreased code rate.

4. The device of claim 2, wherein the at least one processor is further configured to:
   determine that the at least one criterion is satisfied when a current storage capacity across all of the sets of blocks falls below a minimum storage capacity;
   responsive to determining that the criterion is satisfied, identifying at least one of the sets of blocks for which at least one block is marked temporarily inactive;
   decrease the code rate associated with the identified at least one of the sets of blocks; and
   responsive to decreasing the code rate, mark any blocks of the at least one of the sets of blocks that are marked as temporarily inactive as active, wherein any blocks of the at least one of the sets of blocks that are marked as active are again utilized for the data storage operations.

5. The device of claim 4, Wherein the at least one processor is further configured to:
   repeat the identifying, decreasing, and marking until the current storage capacity across all of the set of blocks exceeds the minimum storage capacity.

6. The device of claim 4, wherein the at least one processor is further configured to:
   determine the current storage capacity based at least in part on a number of blocks of each of the sets of blocks that are marked active and the code rate associated with each of the sets of blocks.

7. The device of claim 4, wherein the at least one processor is further configured to:

identify the at least one of the sets of blocks for which at least one block is marked temporarily inactive by determining that the at least one of the sets of blocks comprises a largest number of temporarily inactive blocks relative to others of the sets of blocks.

8. The device of claim 1, wherein east one processor is further configured to:
relocate any valid data in the one of the blocks of the one of the sets of blocks before marking the one of the blocks of the one of the sets of blocks as temporarily inactive.

9. The device of claim 1, wherein the device further comprises at least one random access memory circuit and the flash memory circuits, the blocks comprise physical blocks of the flash memory circuits, and the at least one processor is further configured to:
utilize the sets of the blocks of the flash memory circuits to perform the data storage operations as indicated by a host device; and
maintain a data structure stored in the at least one random access memory circuit, wherein the data structure comprises a status of each block of each of the sets of blocks, the status of each block of each of the sets of blocks indicating at least if each block of each of the sets of blocks is marked active or is marked temporarily inactive.

10. The device of claim 1, wherein the quality comprises at least one of an error count, an error rate, or a time to program.

11. The device of claim 1, wherein the at least one processor is configured to:
arrange the blocks of the flash memory circuits into the sets of blocks.

12. A method comprising:
utilizing sets of blocks of a plurality of flash memory circuits for data storage operations, each of the sets of blocks including at least one block from each of the plurality of flash memory circuits and at least some of the blocks of at least some of the sets of blocks being marked active, wherein the at least some of the blocks of the at least some of the sets of blocks that are marked as active are utilized for the data storage operations;
monitoring a remaining cycle count of each of the blocks of each of the sets of blocks while the at least some of the blocks of the at least some of the sets of blocks that are marked as active are utilized for the data storage operations, wherein the remaining cycle count of each of the blocks of each of the sets of blocks is based at least in part on an expected cycle count associated with each of the plurality of flash memory circuits containing each of the blocks of each of the sets of blocks;
when the remaining cycle count of one of the blocks of one of the sets of blocks satisfies at least one first criterion, marking the one of the blocks of the one of the sets of blocks as temporarily inactive, wherein the one of the blocks of the one of the sets of blocks is not utilized for the data storage operations while marked temporarily inactive;
determine that at least one second criterion is satisfied when a number of the blocks of one of the sets of blocks that are marked as active falls below a minimum number of active blocks for a code rate associated with the one of the sets of blocks, wherein each of the sets of blocks is associated with the code rate; and
when the at least one second criterion is satisfied, mark the one of the blocks of the one of the sets of blocks as active, wherein the one of the blocks of the one of the sets of blocks is again utilized for the data storage operations while marked as active.

13. The method of claim 12, wherein the remaining cycle count of the one of the blocks of the one of the sets of blocks satisfies the at least one first criterion when the remaining cycle count of the one of the blocks of the one of the sets of blocks differs from another remaining cycle count of another one of the blocks of the one of the sets of blocks by a threshold number of cycles.

14. The method of claim 13, further comprising:
determining that the at least one second criterion is satisfied when the remaining cycle count associated with the one of the blocks of the one of the sets of blocks equals the another remaining cycle count associated with the another one of the blocks of the one of the sets of blocks.

15. The method of claim 12, further comprising:
prior to utilizing any of the blocks of any of the sets of blocks for reading or writing operations, cycling a respective block of each of the plurality of flash memory circuits until a respective quality metric of the respective block of each of the plurality of flash memory circuits falls below a minimum quality level;
determining the expected cycle count for each of the plurality of flash memory circuits based at least in part on a number of rapid cycles utilized to cause the respective quality metric of the respective block of each of the plurality of flash memory circuits to fall below the minimum quality level; and
storing the expected cycle count for each of the plurality of flash memory circuits in association with each of the blocks of each of the plurality of flash memory circuits.

16. The method of claim 15, further comprising:
marking the respective block of each of the plurality of flash memory circuits as inactive after cycling the respective block of each of the plurality of flash memory circuits.

17. The method of claim 15, further comprising:
determining the remaining cycle count for each of the blocks of each of the sets of blocks based at least in part on the expected cycle count associated with each of the blocks of each of the sets of blocks and a number of cycles utilized for the data storage operations for each of the blocks of each of the sets of blocks.

18. The method of claim 12, further comprising:
determining that the at least one second criterion is satisfied when a current storage capacity across all of the sets of blocks fails below a minimum storage capacity.

19. A computer program product comprising code stored in a non-transitory computer-readable storage medium, the code comprising:
code to utilize sets of blocks of flash memory circuits for data storage operations, each of the sets of blocks including at least one block from each of the flash memory circuits and at least some of the blocks of at least some of the sets of blocks being marked active, wherein the at least some of the blocks of the at least some of the sets of blocks that are marked as active are utilized for the data storage operations;
code to monitor quality metrics of each block of each of the sets of blocks while the at least some of the blocks of the at least some of the sets of blocks that are marked as active are utilized for the data storage operations;
code to determine when the quality metric of one of the blocks of one of the sets of blocks falls below a minimum quality level;

code to mark the one of the blocks of the one of the sets of blocks as temporarily inactive, wherein the one of the blocks of the one of the sets of blocks is not utilized for the data storage operations while marked temporarily inactive;

code to determine that at least one criterion is satisfied when a number of the blocks of the one of the sets of blocks that are marked as active falls below a minimum number of active blocks for a code rate associated with the one of the sets of blocks, wherein each of the sets of blocks is associated with the code rate; and code to mark the one of the blocks of the one of the sets of blocks as active, when the at least one criterion is satisfied, wherein the one of the blocks of the one of the sets of blocks is again utilized for the data storage operations while marked as active.

20. The computer program product of claim 19, wherein the code further comprises:

code to, when the criterion is satisfied, decrease the code rate associated with the one of the sets of blocks; and code to, when the code rate has been decreased, mark any blocks of the one of the sets of blocks that are marked as temporarily inactive as active, wherein any blocks of the one of the sets of blocks that are marked as active are again utilized for the data storage operations.

21. A system comprising:

a plurality of flash memory circuits each comprising blocks;

a random access memory (RAM) configured to store a data structure that comprises a status of each of the blocks of each of the plurality of flash memory circuits, the status of each of the blocks of each of the plurality of flash memory circuits indicating at least if each of the blocks of each of the plurality of flash memory circuits is marked active or is marked temporarily inactive;

an interface communicatively coupled to a host device; and a controller configured to:

utilize sets of the blocks of the plurality of flash memory circuits for data storage operations indicated by the host device, each of the sets of the blocks including at least one block from each of the plurality of flash memory circuits and at least some of the blocks of at least some of the sets of the blocks being marked active in the data structure, wherein the at least some of the blocks of the at least some of the sets of the blocks that are marked as active in the data structure are utilized for the data storage operations;

monitor a quality metric of each of the blocks of each of the sets of the blocks while the at least some of the blocks of the at least some of the sets of the blocks that are marked as active in the data structure are utilized for the data storage operations;

determine when the quality metric of one of the blocks of one of the sets of the blocks falls below a minimum quality level;

mark the one of the blocks of the one of the sets of the blocks as temporarily inactive the data structure, wherein the one of the blocks of the one of the sets of the blocks is not utilized for the data storage operations while marked temporarily inactive in the data structure;

determine that at least one criterion is satisfied when a number of the blocks of the one of the sets of the blocks that are marked as active falls below a minimum number of active blocks for a code rate associated with the one of the sets of the blocks, wherein each of the sets of the blocks is associated with the code rate; and when the at least one criterion is satisfied, mark the one of the blocks of the one of the sets of the blocks as active in the data structure, wherein the one of the blocks of the one of the sets of the blocks is again utilized for the data storage operations while marked as active in the data structure.

* * * * *